(12) United States Patent
Lomnitz et al.

(10) Patent No.: US 12,069,537 B2
(45) Date of Patent: Aug. 20, 2024

(54) SYSTEMS FOR CONTROLLING ACQUISITION OF TEST DATA FROM DEVICES

(71) Applicant: HEADSPIN, INC., Palo Alto, CA (US)

(72) Inventors: Jason Lomnitz, Woodland, CA (US); Stepan Salenikovich, Montreal (CA); Brian Perea, Menlo Park, CA (US); Brien Colwell, Redwood City, CA (US)

(73) Assignee: HEADSPIN, INC., Palo Alto, CA (US)

( * ) Notice: Subject to any disclaimer, the term of this patent is extended or adjusted under 35 U.S.C. 154(b) by 319 days.

(21) Appl. No.: 17/302,884

(22) Filed: May 14, 2021

(65) Prior Publication Data
US 2022/0369064 A1    Nov. 17, 2022

(51) Int. Cl.
| | |
|---|---|
| H04W 24/02 | (2009.01) |
| H04W 4/02 | (2018.01) |
| H04W 4/029 | (2018.01) |
| H04W 52/02 | (2009.01) |

(52) U.S. Cl.
CPC .......... *H04W 4/029* (2018.02); *H04W 4/023* (2013.01); *H04W 24/02* (2013.01); *H04W 52/0225* (2013.01)

(58) Field of Classification Search
CPC ..... H04W 4/029; H04W 4/023; H04W 24/02; H04W 52/0225
See application file for complete search history.

(56) References Cited

U.S. PATENT DOCUMENTS

| | | | |
|---|---|---|---|
| 6,980,131 B1 | 12/2005 | Taylor | |
| 7,165,190 B1 | 1/2007 | Srivastava et al. | |
| 7,870,244 B2 * | 1/2011 | Chong | G06F 11/3006 370/467 |
| 8,719,798 B2 * | 5/2014 | Unger | G06F 11/3624 717/130 |
| 9,348,727 B1 | 5/2016 | Cai et al. | |
| 9,374,423 B2 | 6/2016 | Crosbie et al. | |
| 9,384,525 B2 * | 7/2016 | Lambert | G06T 1/20 |
| 9,693,050 B1 | 6/2017 | Madhani et al. | |
| 10,129,769 B2 * | 11/2018 | Logan | H04W 28/021 |

(Continued)

OTHER PUBLICATIONS

Pan, Hang, "Non-final Office Action dated Apr. 12, 2022", U.S. Appl. No. 17/206,926, The United States Patent and Trademark Office, Apr. 12, 2022.

(Continued)

*Primary Examiner* — Douglas M Slachta
(74) *Attorney, Agent, or Firm* — Lindauer Law, PLLC

(57) ABSTRACT

A first device executing an application determines data indicative of conditions associated with the first device during use of the application. Based on correspondence between this data and threshold data that indicates conditions in which frames representing a display output of the first device should be stored, the first device is caused to send data indicative of these frames to a second device. The second device generates user interface data based in part on the received frames and may send the user interface data to other devices. To reduce the amount of data sent and the computational resources used, the first device may store only changed frames of display output, and may send data to the second device at times when a communication interface of the first device is active for other purposes.

20 Claims, 5 Drawing Sheets

(56) References Cited

U.S. PATENT DOCUMENTS

| | | | |
|---|---|---|---|
| 10,153,956 B2* | 12/2018 | Ludwig | H04L 43/0817 |
| 10,771,366 B2* | 9/2020 | Malnati | H04L 43/0894 |
| 2004/0064552 A1 | 4/2004 | Chong et al. | |
| 2006/0136916 A1* | 6/2006 | Rowland | H04L 43/00 |
| | | | 718/100 |
| 2006/0294158 A1* | 12/2006 | Tsyganskiy | G06F 8/72 |
| 2009/0061845 A1 | 3/2009 | King | |
| 2009/0217309 A1* | 8/2009 | Grechanik | G06F 11/3692 |
| | | | 719/328 |
| 2010/0145978 A1* | 6/2010 | Anashkin | G06F 16/2358 |
| | | | 707/769 |
| 2011/0246834 A1 | 10/2011 | Rajashekara et al. | |
| 2012/0072888 A1* | 3/2012 | Sugimoto | G06F 11/3093 |
| | | | 717/128 |
| 2014/0280177 A1* | 9/2014 | Ishii | G06F 16/285 |
| | | | 707/740 |
| 2017/0093995 A1* | 3/2017 | Nitsan | G06F 11/3466 |
| 2017/0168914 A1 | 6/2017 | Altman et al. | |
| 2018/0011775 A1* | 1/2018 | Baines | G06F 11/3664 |
| 2018/0232431 A1* | 8/2018 | Natarajan | G06F 21/604 |
| 2019/0095304 A1* | 3/2019 | Kumarasamy | G06F 11/3072 |

OTHER PUBLICATIONS

Pan, Hang, "Notice of Allowance dated Aug. 5, 2022", U.S. Appl. No. 17/206,926, The United States Patent and Trademark Office, Aug. 5, 2022.

Alonso Nogueiro, L., "Patent Cooperation Treaty International Search Report and Written Opinion dated May 12, 2022", Patent Cooperation Treaty Application No. PCT/US22/70363, Patent Cooperation Treaty, May 12, 2022.

Alonso Nogueira, L., "Patent Cooperation Treaty International Preliminary Report on Patentability and Written Opinion dated Nov. 14, 2023", Patent Cooperation Treaty Application No. PCT/USUS22/70363, Patent Cooperation Treaty, Nov. 14, 2023.

\* cited by examiner

SYSTEMS FOR CONTROLLING ACQUISITION OF TEST DATA FROM DEVICES

BACKGROUND

Applications may function differently at different locations, on different devices, and under different network conditions. For example, the quality or other characteristics of a video output or audio output, the use of computational resources by a device, or other aspects of the application or the device may be affected by these factors. Acquiring information regarding performance of devices during use of an application under various conditions may be useful for identifying and addressing issues to improve performance of the application. However, the times and manners in which resource-intensive data, such as frames of video data, is acquired and transmitted may affect the performance of a device, and only a portion of the acquired data may include useful information.

INCORPORATION BY REFERENCE

U.S. patent application Ser. No. 14/850,798, filed Sep. 10, 2015 and titled "System for Application Test", now U.S. Pat. No. 9,681,318, is hereby incorporated by reference in its entirety.

U.S. patent application Ser. No. 15/425,757, filed Feb. 6, 2017 and titled "Mobile Device Point of Presence Infrastructure", now U.S. Pat. No. 10,729,038, is hereby incorporated by reference in its entirety.

U.S. patent application Ser. No. 15/425,652, filed Feb. 6, 2017 and titled "System for Management of an Array of Proxy Access Devices", now U.S. Pat. No. 10,855,789 is hereby incorporated by reference in its entirety.

U.S. patent application Ser. No. 15/783,859, filed Oct. 13, 2017 and titled "System for Testing Using Remote Connectivity" is hereby incorporated by reference in its entirety.

U.S. patent application Ser. No. 16/056,797, filed Aug. 7, 2018 and titled "System for Controlling Transfer of Data to a Connected Device" is hereby incorporated by reference in its entirety.

U.S. patent application Ser. No. 16/694,886, filed Nov. 25, 2019 and titled "System for Identifying Issues During Testing of Applications" is hereby incorporated by reference in its entirety.

U.S. patent application Ser. No. 17/006,596, filed Aug. 28, 2020 and titled "Reference-Free System for Determining Quality of Video Data" is hereby incorporated by reference in its entirety.

U.S. patent application Ser. No. 17/179,136, filed Feb. 18, 2021, and titled "Systems for Remote Communication with Test Devices" is hereby incorporated by reference in its entirety.

U.S. patent application Ser. No. 17/206,926, filed Mar. 19, 2021, and titled "Systems for Remote Determination of Data from Test Devices" is hereby incorporated by reference in its entirety.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
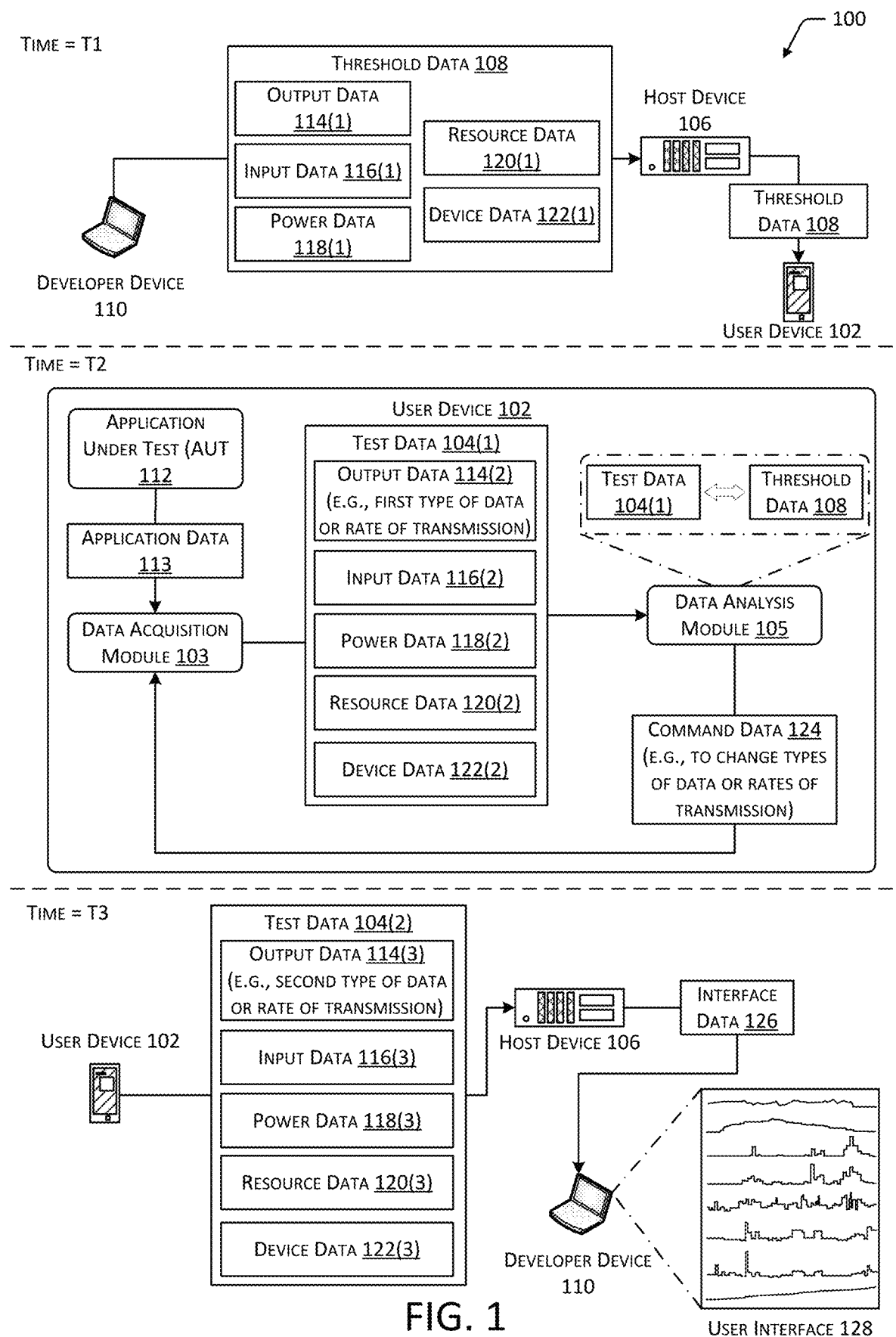
FIG. 1 is a series of diagrams depicting an implementation of a system for causing a user device to determine test data and to transmit the test data, or other data determined based on the test data, to a host device under various conditions.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A computing device may provide various functions, some of which may be associated with execution of one or more applications. A computing device may include, for example, a smartphone, a laptop computer, a tablet computer, a desktop computer, a server, an embedded computing device, a wearable computing device, an appliance, a computing device associated with a vehicle (such as an infotainment system or vehicle management or monitoring system), a set top box device, a smart television, a network-enabled speaker, and so forth. The functions provided by a computing device may include, without limitation, retrieval, transmission, or processing of data, presentation of output using a display, speaker, or other type of output device, acquisition of input using a camera, microphone, or other input device, and so forth. For example, a smartphone executing an application may present video output using a display, audio output using a speaker, and so forth. The quality or other characteristics of the video output or audio output may be affected by one or more conditions associated with the smartphone.

The performance of an application executed by a computing device may be evaluated based on various characteristics. For example, characteristics associated with use of an application may include a quality associated with a video output or audio output, an amount of content that is presented, an amount of data that is transferred, use of computational resources (such as memory or processor use) that is associated with various functions of the application, and so forth. In some cases, these characteristics may be affected by the location of the device executing the application, characteristics of the computing device itself, characteristics of one or more networks used to exchange data, and so forth. In some cases, these characteristics may represent suboptimal performance of the application, such as a video output having a quality less than a selected quality. A developer of an application may seek to test performance of the application or a computing device executing the application under certain conditions. This testing process may enable the developer to discover issues that may occur during use of the application under those conditions, which the developer may then address to attempt to improve performance of the application. However, configuring a computing device to acquire and transmit certain types of data, such as frames of video data, may utilize significant amounts of computational resources and may result in the acquisition of some data that is not useful for determining performance of the application or computing device. For example, if the display output of a computing device does not change for an extended period of time, acquiring and transmitting multiple frames of video data that represent the same display output may use computational resources, while the data that is acquired may not be useful for determining performance of the application or computing device.

Described in this disclosure are systems and methods for controlling the acquisition and transmission of data from an edge device (e.g., a user device), such as a smartphone, a vehicle-based system, a personal computer, or other type of computing device associated with a user, to determine test data during execution and use of an application. For example, computer-executable instructions for acquiring data regarding characteristics of the application, characteristics of the user device executing the application, characteristics of networks accessed by the user device, or characteristics of other computing devices accessed by the user device may be included within an application, such as a software development kit (SDK). In other implementations, an SDK or other type of computer-executable instructions may function as a system application or within the operating system of the user device. The user device may communicate with a server or other type of computing device, which may control the times and manners in which test data is acquired and transmitted by the user device.

For example, a developer of an application may specify one or more conditions under which data may be acquired by a user device, and one or more condition(s) under which the data may be transmitted by the user device to another computing device. Such conditions may include a charging status of a battery or other power source of the user device, a quantity of remaining charge associated with the power source, or other characteristics or statuses of the user device itself. In other cases, such conditions may include receipt of particular input by the user device, such as user input to a control indicating an issue associated with performance of the application, user input that indicates a failure of the application to perform as expected, such as rapidly tapping a touch sensor, text input indicative of an issue, audio input from a user that includes vocal biomarkers indicative of negative sentiment or language indicative of poor performance of the application, and so forth. In still other cases, such conditions may include presentation of particular output, such as frames of video data or image data having a quality less than a threshold quality or other characteristics that deviate from a selected value. For example, frames of video data that indicate a small amount of content presented on a display area, or an animation associated with loading or buffering of data that is presented for greater than a threshold length of time, may represent issues associated with performance of the application. In some cases, the conditions may include one or more values associated with use of computational resources by the user device, such as processor use or memory use that exceeds a threshold value, reduction in the remaining charge of a power source that is greater than a threshold value, and so forth. A server or other computing device may receive the specified conditions from a computing device used by a developer and may store the conditions as threshold data.

During use of the application, the SDK or other type of computer-executable instructions may cause a user device to determine and store first test data, such as in a buffer or other data storage medium. The first test data may include data indicative of output presented by the user device, such as screen capture data indicative of display output, audio capture data indicative of audio outputs, and so forth. The first test data may also include data indicative of input received by the user device, such as input acquired using a microphone, camera, keyboard, touch sensor, or other input device. The first test data may additionally include data indicative of components of the user device that are used, such as a display, speaker, microphone, camera, wireless communication interface, and so forth. The first test data may also include data indicative of quantities of data sent or received by the user device, types of data sent or received, and so forth. In some cases, the first test data may include data indicative of a location of the user device, such as a location determined using a global positioning system (GPS) receiver or other type of location sensor, a location determined using one or more network addresses, or so forth. Additionally, in some cases, the first test data may include information regarding a user of the user device, such as information associated with a user account, information regarding networks or other computing devices accessed by the user device, characteristics of the accessed networks, and so forth.

In some implementations, the user device may process the test data to determine performance data, such as one or more values, metrics, or other representations of at least a portion of the test data. As such, the term "test data" may include data acquired by a computing device as well as data that is determined based on the acquired data. In some implementations, the server or other computing device may receive at least a portion of the first test data from the user device and determine performance data or other data based on the test data. The user device or the server may determine correspondence between the conditions represented by the first test data and the conditions indicated in the threshold data. For example, the conditions may specify particular characteristics of a frame of video data that may be indicative of an issue associated with performance of the application, and a particular quantity of remaining charge associated with the power source of a user device. Continuing the example, the user device, server, or other computing device may determine that the first test data indicates that the quantity of charge associated with the power source of the user device is greater than a threshold value and that a received frame of video data representing a display output of the user device corresponds to threshold data indicative of an error or other issue associated with the frame. Based on this determination, a command or other data may be generated to cause the user device to acquire second test data, which may be processed by the user device to determine additional data, sent to the server for processing, or both the user device and server may determine additional data based on the second test data.

For example, the second test data may include additional frames of video data. Continuously acquiring, processing, and sending video data, or other data determined based on the video data, may consume computational resources, while only a portion of the video data may be useful for determining performance of the user device or the application. However, by determining correspondence between the first test data and the threshold data prior to causing the user device to acquire, process, or transmit the second test data or other data based on the second test data, the use of computational resources associated with the handling of non-useful data may be reduced.

Additionally, in some implementations, the SDK or other type of computer-executable instructions may cause the user device to acquire and transmit the second test data, or other data determined based on the second test data, at certain times or in certain manners. For example, the user device may be configured to only acquire, process, or transmit a frame of video data, or other data determined based on the video data, if a change in a display output associated with the application is determined. Continuing the example, the SDK may determine when a portion of a display associated with an application, such as a window associated with the application that is within a foreground of the display of the user device, is refreshed. As another example, the SDK may determine when the application performs a function associated with a change in a display output. In cases where the SDK functions as a system application or within the operating system of the user device, the SDK may determine changes in the display output regardless of whether the changes are associated with the application. In response to one or more of these determinations, the user device may buffer or store particular frames of video data. Storage, processing, or transmission of frames of video data, or other data determined based on the video data, that correspond to times when a display output is changed may reduce the determination, storage, processing, or transmission of redundant or non-useful test data, which may conserve computational resources and reduce the impact of use of the SDK on performance of the user device or application.

Additionally, in some implementations, the user device may be configured to transmit one or more frames of video data, or other data determined based on the video data, based on a status of a wireless communication interface (such as a Wi-Fi radio) of the user device. For example, the user device may be configured to determine that the wireless communication interface is active, such as for use transmitting or receiving data unrelated to the SDK, prior to sending data to the server. In some cases, the active status of the wireless communication interface may be determined by determining an amount of data transmitted or received at a first time, and at a second time subsequent to the first time, and determining a difference between the amounts of data at the first time and second time. In other implementations, the user device may be configured to determine that the wireless communication interface is active, and that the wireless communication interface has not transmitted or received data for at least a threshold period of time. For example, the user device may be configured to withhold transmission of the data to the server until after the user device has completed another transmission or receipt of data using the wireless communication interface, then transmit the data to the server while the wireless communication interface remains active. Withholding transmission of frames of video data, other test data, or performance data determined based on test data until times when an active status of a wireless communication interface is determined may reduce the use of computational resources used by the SDK, such as by reducing the power and other resources that would otherwise be used to activate the wireless communication interface. Withholding transmission of the data to the server until transmission or receipt of other data by the user device for other purposes has ceased for at least a threshold period of time may reduce the impact of the transmission of the data to the server on the performance of the user device or application.

In some implementations, the rate or other characteristics associated with processing of the second test data by the user device, or in some implementations by the server or another computing device, may further be used to control the determination or transmission of the second test data by the user device. For example, if a rate at which the second test data is acquired by the user device exceeds a threshold value associated with a rate of processing of the second test data, a command or other data may be generated to cause the user device to cease determining or transmitting the second test data, or to decrease a rate of determination or transmission of the second test data.

The server or other computing device that receives the data from the user device may generate user interface data indicative of at least a portion of the second test data. The user interface data may be stored, sent to a computing device associated with the developer of the application or another user, and so forth. The user interface data may cause presentation of an interface that indicates performance metrics associated with operation of the application or the user device. Example user interfaces are described, without limitation, in U.S. patent application Ser. Nos. 14/850,798; 15/425,757; 15/425,652; 15/783,859; and Ser. No. 16/694,886, incorporated by reference previously.

Enabling a developer of an application to specify particular conditions under which particular types of data are acquired, processed, and transmitted by a user device may utilize less time, cost, and computational resources when compared to the continuous acquisition of test data. Additionally, use of the specified conditions to control the acquisition, processing, and transmission of test data by user devices may prevent use of devices with constrained resources or reduce the impact of the acquisition, processing, and transmission of test data on the performance of the user device or application. For example, a developer may input parameters that prevent devices having processor or memory use that is greater than a threshold, or a charge state of a battery that is less than a threshold, from expending computational resources to acquire test data, process test data, or transmit data to a server at a time when the resources of the device are constrained.

FIG. 1 is a series of diagrams 100 depicting an implementation of a system for causing a user device 102 to determine test data 104 and to transmit the test data 104, or other data determined based on the test data 104, to a host device 106 under various conditions. At a first time T1, the host device 106 may determine threshold data 108 indicative of one or more conditions in response to which a user device 102 may be caused to one or more of determine, process, or transmit test data 104. For example, a developer device 110 associated with a developer or other user that is associated with an application under test (AUT) 112 may transmit the threshold data 108, or data from which the threshold data 108 may be determined, to one or more host devices 106. While FIG. 1 depicts the host device 106 as a server, the host device may include any number and any type of computing device(s) including, without limitation, a smartphone, a portable computing device, a vehicle-based computing device (such as an infotainment system, vehicle monitoring system, vehicle communication system, fleet management or vehicle control system, and so forth), a wearable computing device, a personal computer, one or more servers, and so forth. Additionally, while FIG. 1 depicts the developer device 110 as a personal computer, the developer device 110 may include any number and any type of computing device(s) including, without limitation, the types of computing devices described with regard to the host device 106.

The threshold data 108 may indicate various conditions under which a user device 102 may be caused to determine test data 104, process the test data 104, or transmit the test data 104 or other data determined based on the test data 104 to the host device 106, or to perform one or more other functions. For example, the threshold data 108 may indicate first output data 114(1). The first output data 114(1) may be indicative of one or more characteristics of an output that may be presented by a user device 102. For example, the first output data 114(1) may indicate a quality or other characteristic of a video output or an audio output that may be indicative of an issue associated with the AUT 112, specific text, graphical output, or other types of output that may be indicative of the issue, and so forth. Continuing the example, the first output data 114(1) may indicate a particular arrangement of pixels indicative of an animation associated with loading or buffering of content, and may indicate that if such an output is determined, this may indicate an issue associated with the AUT 112. As another example, the first output data 114(1) may indicate a particular amount of a display area to be occupied by content, and if a portion of the display area less than the indicated amount is occupied, this may indicate an issue associated with the AUT 112. As yet another example, the first output data 114(1) may indicate a metric value associated with a quality of a video output or audio output, and if an output presented by a user device 102 is associated with a lower quality than the indicated metric value, this may indicate an issue associated with the AUT 112.

The threshold data 108 may indicate first input data 116(1). The first input data 116(1) may be indicative of one or more characteristics of an input that may be received by a user device 102. For example, the first input data 116(1) may indicate particular inputs, types of inputs, or properties of inputs that may be indicative of an issue associated with the AUT 112. Continuing the example, the first input data 116(1) may indicate user input provided to a control for indicating an issue, specific text or audio input that may be indicative of an issue, and so forth. As another example, the first input data 116(1) may indicate particular types of user input that may be indicative of an issue associated with the AUT 112, such as rapid touch inputs to a touch sensor, audio input or input to a camera that includes vocal or facial biomarkers indicative of negative user responses, and so forth.

The threshold data 108 may indicate first power data 118(1). The first power data 118(1) may indicate a charging status of a power source associated with the user device 102. For example, a charging status may indicate that the user device 102 is in electrical communication with a source of a/c power, a battery or other power source is currently being charged, and so forth. The first power data 118(1) may also indicate a quantity of remaining power associated with a power source of the user device 102. For example, the first power data 118(1) may indicate a quantity of remaining power in milliamp-hours or another unit, a relative quantity of power such as a quantity of remaining power versus the total capacity of the power source expressed as a percentage, and so forth.

The threshold data 108 may indicate first resource data 120(1). The first resource data 120(1) may indicate hardware or software components of the user device 102 that are present, absent, active, inactive, currently in use, or currently not in use. For example, the first resource data 120(1) may indicate whether a display device, speaker device, microphone, camera, or other input or output device are currently presenting output or receiving input. As another example, the first resource data 120(1) may indicate whether a wireless communication interface of the user device 102 is currently active, currently transmitting or receiving data, and so forth. The first resource data 120(1) may also indicate computational resources utilized by the user device 102, such as a quantity of processor or memory use, a quantity of data transmitted or received, and so forth.

The threshold data 108 may indicate first device data 122(1). The first device data 122(1) may indicate one or more characteristics of user devices 102, such as device types, manufacturers, components, identifiers associated with specific user devices 102 or groups of user devices 102, and so forth. In some implementations, the first device data 122(1) may indicate a geographic region or location associated with one or more user devices 102, one or more networks accessed by the user device(s) 102, one or more other computing devices accessed by the user device(s) 102, types of characteristics of networks or other computing devices accessed by the user device(s) 102, and so forth.

While FIG. 1 depicts the threshold data 108 including first output data 114(1), first input data 116(1), first power data 118(1), first resource data 120(1), and first device data 122(1), in other implementations, one or more of the described types of data may be omitted from the threshold data 108. Additionally, in some implementations, other characteristics or functions of a user device 102, components of the user device 102, networks or other computing devices accessed by the user device 102 or AUT 112 may be included in the threshold data 108. While FIG. 1 depicts the developer device 110 providing the threshold data 108 to the host device 106, in other implementations, the host device 106 may access existing threshold data 108 or default threshold data 108, and input of the threshold data 108 using a developer device 110 may be omitted. In some implementations, threshold data 108 may be determined automatically, such by using a machine learning module to determine default threshold data 108 based on previous conditions received from computing devices, the quality of data acquired from user devices 102 under various conditions, the impact on the performance of user devices 102 or AUTs 112 caused by the acquisition, processing, or transmission of test data 104 or other data, and so forth. Additionally, while FIG. 1 depicts the host device 106 providing the threshold data 108 to the user device 102, in other implementations, the host device 106 may provide other data determined based on the threshold data 108 to the user device 102, the user device 102 may access default or existing threshold data 108, or the user device 102 may determine at least a portion of the threshold data 108 automatically, as described above.

At a second time T2 after the first time T1, a user device 102 executing or performing one or more functions associated with the AUT 112 may determine first test data 104(1). The AUT 112 may include an application that is at any stage in a development or maintenance lifecycle. For example, the AUT 112 may include software that has not yet been released (e.g., an alpha, prerelease, or pre-launch version), or may include a previously-released version that is undergoing testing. While FIG. 1 depicts the user device 102 as a smartphone, the user device 102 may include any number and any type of computing device(s) including, without limitation, the types of computing devices described with regard to the host device 106 and the developer device 110. The user device 102 may store an SDK or other type of computer-executable instructions to cause the user device 102 to one or more of acquire, process, or transmit test data 104. For example, a data acquisition module 103 associated with the user device 102 may determine application data 113 associated with the AUT 112. The application data 113 may include data indicative of functions performed by the AUT 112, user input received that is associated with the AUT 112, presented output that is associated with the AUT 112, computational resources or components of the user device 102 that are utilized due to functions performed by the AUT 112, and so forth. In some cases, the application data 113, or other data acquired by the data acquisition module 103, may include data indicative of the status, operation, or use of components or other resources associated with the user device 102. The data acquisition module 103 may determine first test data 104(1) based at least in part on the application data 113. In some implementations, the data acquisition module 103 may be associated with an SDK or other type of computer-executable instructions, which may be incorporated within the AUT 112. In other implementations, the SDK or other type of computer-executable instructions may function as a system application or within the operating system of the user device 102. For example, the SDK or other type of instructions may cause the user device 102 to determine and store the first test data 104(1), such as in a buffer or other data storage medium, as a user interacts with the user device 102 to perform functions associated with the AUT 112.

The first test data 104(1) may include second output data 114(2). The second output data 114(2) may represent output presented using one or more output devices associated with the user device 102 during use of the AUT 112. For example, the second output data 114(2) may include one or more frames of video data presented while a user interacts with the user device 102 during use of the AUT 112. The second output data 114(2) may include data representing other types of output, such as audio data, text, data indicative of a haptic output, and so forth. In some implementations, the second output data 114(2) may include one or more values, characteristics, or other data determined based on a presented output. For example, a user device 102 may process at least a portion of the first test data 104(1) to determine performance data, such as metric values or other data indicative of performance of the user device 102 or AUT 112. In such a case, the second output data 114(2) may include the data indicative of the performance of the user or device 102 or AUT 112 rather than frames of video data or other test data 104(1) representing a presented output. Example systems and methods for determining performance data based on presented outputs using a user device 102 are described in U.S. patent application Ser. No. 17/206,926, incorporated by reference previously.

The first test data 104(1) may include second input data 116(2). The second input data 116(2) may represent input acquired by the user device 102 during use of the AUT 112. For example, the second input data 116(2) may include image data or video data acquired using a camera, audio data acquired using a microphone, touch input acquired using a touch sensor, text input using a keyboard or other input device, input provided to a mouse device, and so forth. In some implementations, the user device 102 may process at least a portion of the first test data 104(1), and the second input data 116(2) may include performance data, such as one or more values, characteristics, or other data determined based on an acquired input rather than data representing the input itself.

The first test data 104(1) may include second power data 118(2). The second power data 118(2) may indicate a charging status of a power source associated with the user device 102, a quantity of remaining power associated with the power source, a type or characteristic of the power source, and so forth. For example, the second power data 118(2) may indicate whether the user device 102 is in electrical communication with a source of a/c power, whether a battery of the user device 102 is currently charging, a relative or absolute quantity of power stored in a battery or other power source, and so forth.

The first test data 104(1) may include second resource data 120(2). The second resource data 120(2) may indicate a quantity of computational resources utilized by the user device 102, such as a quantity of processor or memory utilization, amounts of data transmitted or received, amounts of electrical power used, and so forth. The second resource data 120(2) may associate the quantities of computational resources that are utilized with the AUT 112, with specific functions of the AUT 112, or with operation of the user device 102 in general, independent of the functions performed by the AUT 112. The second resource data 120(2) may also indicate hardware or software components of the user device 102 that are present, absent, active, inactive, currently in use, or currently not in use. For example, the second resource data 120(2) may indicate whether a wireless communication interface of the user device 102 is currently in an active state, whether the wireless communication interface is currently being used to transmit or receive data, and so forth. As another example, the second resource data 120(2) may indicate whether a display device, speaker, or other output device is in use, whether a camera, microphone, or other input device is in use, and so forth. In some cases, the second resource data 120(2) may indicate particular characteristics of the use of an input or output device, such as a quantity of a display area of a display device in use, an amount of electrical power or computational resources used by a particular component of the user device 102, and so forth.

The first test data 104(1) may include second device data 122(2). The second device data 122(2) may indicate a device type or model associated with the user device 102, a location of the user device 102, a version or other characteristics of the AUT 112, one or more identifiers associated with the user device 102, an indication of components of the user device 102, and so forth.

While FIG. 1 depicts the first test data 104(1) including second output data 114(2), second input data 116(2), second power data 118(2), second resource data 120(2), and second device data 122(2), in other implementations, one or more of the described types of data may be omitted from the first test data 104(1). For example, the user device 102 may refrain from determining frames of video data or other types of output data 114 that may consume significant computational resources to determine, process, or transmit, while determining, processing, or transmitting other types of data, such as power data 118, that may consume fewer computational resources.

A data analysis module 105 associated with the user device 102 may be used to control the acquisition of additional data by the user device 102 based on at least a portion of the first test data 104(1), or other data determined based on the first test data 104(1). The data analysis module 105 may determine correspondence between the first test data 104(1) and the threshold data 108. For example, the threshold data 108 may indicate one or more conditions under which the user device 102 is to be configured to determine, process, or transmit particular types of data. Correspondence between the first test data 104(1) and the threshold data 108 may indicate whether the conditions indicated in the threshold data 108 are met. For example, the threshold data 108 may indicate particular characteristics of a frame of video data that may indicate an issue associated with performance of the AUT 112. If a frame of video data included in the first test data 104(1) corresponds to the characteristics of the frame of video data indicated in the threshold data 108 within a threshold similarity, this correspondence may indicate that the user device 102 should be caused to acquire, process, or transmit additional test data 104(2) due to the potential issue associated with the performance of the AUT 112. As another example, the threshold data 108 may indicate a threshold minimum quantity of power associated with a power source of the user device 102. If the test data 104(1) indicates that a quantity of power associated with the power source of the user device 102 is greater than the threshold minimum quantity, the user device 102 may be caused to acquire, process, or transmit additional test data 104(2). However, if the test data 104(1) indicates that the quantity of power is less than the threshold minimum quantity, the user device 102 may not be caused to acquire, process, or transmit additional test data 104(2) to prevent depletion of the power source of the user device 102.

Based on correspondence between the first test data 104(1) and the threshold data 108, the data analysis module 105 may provide command data 124 to the data acquisition module 103 to cause the user device 102 to determine, process, or transmit additional test data 104(2). For example, the first test data 104(1) determined by the user device 102 may include second output data 114(2), such as frames of video data, at a first rate, having a first resolution, and so forth. However, if the first test data 104(1) indicates a possible issue associated with performance of the AUT 112, additional test data 104(2) that is determined by the user device 102 may include output data 114 acquired at a greater rate, having a greater resolution, and so forth. The command data 124 may indicate particular types of data to be determined by the user device 102, particular manners in which the data is to be acquired, and so forth.

In other implementations, at least a portion of the first test data 104(1), or other data determined based on the first test data 104(1), may be provided to the host device 106. Based on correspondence between the first test data 104(1) and threshold data 108, or other data stored in association with the host device 106, the host device 106 may provide command data 124 or additional threshold data 108 to the user device 102 to cause the user device 102 to acquire, process, or transmit additional test data 104(2).

At a third time T3 after the second time T2, the user device 102 may determine second test data 104(2) and may transmit the second test data 104(2), or other data determined based on the second test data 104(2), to the host device 106. The second test data 104(2) may include third output data 114(3), third input data 116(3), third power data 118(3), third resource data 120(3), and third device data 122(3). While FIG. 1 depicts the second test data 104(2) including the same types of data as those described with regard to the first test data 104(1), in some implementations, the second test data 104(2) may include one or more different types of data. For example, the first test data 104(1) may include second power data 118(2) and second resource data 120(2) that indicates a potential issue associated with performance of the AUT 112. Based on the first test data 104(1) the user device 102 may determine second test data 104(2) that includes third output data 114(3), such as frames of video data, acquired audio data, and so forth. Determination, processing, or transmission of video data continuously may utilize large quantities of computational resources, but use of the first test data 104(1) to determine potential issues associated with the AUT 112 and times when acquisition of the third output data 114(3) may be useful for identifying such issues may conserve computational resources and reduce the acquisition of non-useful data. As another example, the first test data 104(1) may include second output data 114(2), such as frames of video data acquired at a first rate or having a first resolution, while in response to a possible issue associated with the AUT 112, the second test data 104(2) may include third output data 114(3) acquired at a greater rate or having a greater resolution to facilitate identification of the issues associated with the AUT 112.

The host device 106 may determine interface data 126 based on at least a portion of the second test data 104(2) or other data received from the user device 102, and in some cases, data received from other devices. The interface data 126 may be used to cause presentation of one or more user interfaces 128 that represent at least a portion of the second test data 104(2), values determined based on the second test data 104(2), and so forth. In some implementations, the interface data 126 may also represent at least a portion of the first test data 104(1) or values determined based on the first test data 104(1). For example, a user interface 128 may indicate quantities of computational resources used by the user device 102 over time, quantities of data transmitted or received by the user device 102, quantities of power used by the user device 102, an indication of video or audio quality or other characteristics of video or audio output, and so forth. The interface data 126 may be provided to a developer device 110 or another computing device, to cause presentation of one or more user interfaces 128 indicative of this information. Example user interfaces are described, without limitation, in U.S. patent application Ser. Nos. 14/850,798; 15/425,757; 15/425,652; 15/783,859; and Ser. No. 16/694,886, incorporated by reference previously.

Figure 2:
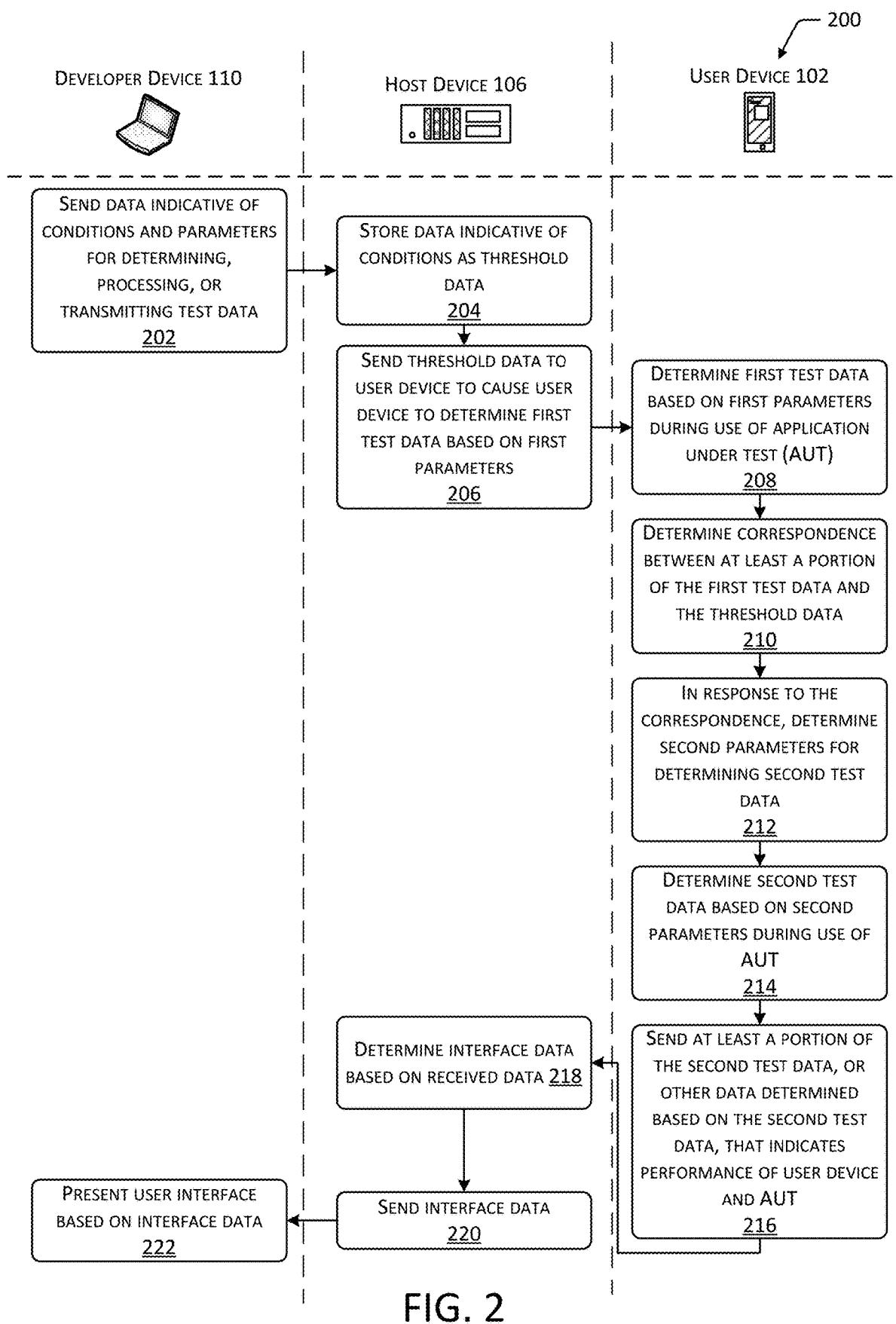
FIG. 2 is a diagram depicting an implementation of a method for exchanging data between a user device, host device, and developer device, that indicates conditions and performance characteristics associated with the user device or an application under test.

FIG. 2 is a diagram 200 depicting an implementation of a method for exchanging data between a user device 102, host device 106, and developer device 110, that indicates conditions and performance characteristics associated with the user device 102 or an application under test 112. At 202, the developer device 110 may send data indicative of conditions and parameters for determining, processing, or transmitting test data 104 to the host device 106. For example, a developer associated with an AUT 112 may input particular types of data to be acquired by a user device 102, such as one or more types of output data 114, input data 116, power data 118, resource data 120, device data 122, and so forth. The data from the developer device 110 may also indicate particular conditions during which certain types of data may be determined, processed, or transmitted by the user device 102. For example, a condition may indicate specific content of a frame of video data, a quantity of power associated with a power source being greater than a threshold value, a quantity of computational resources utilized by the user device 102 being less than a threshold value, and so forth. The data from the developer device 110 may also indicate parameters representing the manner in which particular types of data are to be determined and transmitted. For example, a parameter may indicate a rate at which frames of video data are to be determined and stored, a rate at which frames of video data are to be processed, a rate at which video data or other data determined based on the video data is to be transmitted, a resolution or other characteristic for storage of the video data, and so forth.

At 204, the host device 106 may store the data indicative of the conditions as threshold data 108. In other implementations, the host device 106 may use a default or preexisting set of conditions and parameters to control operation of the user device 102, and receipt of data indicating conditions and parameters from the developer device 110 may be omitted.

At 206, the host device 106 may send at least a portion of the threshold data 108 to the user device 102 to cause the user device 102 to determine first test data 104(1) based on the first parameters. For example, the user device 102 may be configured to begin determining the first test data 104(1) in response to the first parameters, the threshold data 108, or one or more conditions associated with the user device 102 corresponding to the threshold data 108. In other implementations, the host device 106 may send a command, instruction, or other type of data to the user device 102 to cause the user device 102 to begin determining first test data 104(1). In some implementations, the command or other instruction may indicate one or more types of data to be acquired, and in some cases, the manner in which the data is to be acquired. For example, the data sent to the user device 102 may cause the user device 102 to begin determining first power data 118(1) indicative of a quantity of remaining power in a power source, first resource data 120(1) indicative of processor and memory use of the user device 102, and first output data 114(1) that includes frames of video data acquired and processed by the user device 102 at a first rate.

At 208, the user device 102 may determine the first test data 104(1) based on the first parameters during use of the application under test (AUT) 112. In some implementations, if the threshold data 108 or data sent by the host device 106 do not specify one or more types of data, or specify a type of data without specifying one or more parameters, the user device 102 may determine, process, or transmit one or more portions of the first test data 104(1) based on a default or preexisting set of parameters. As described with regard to FIG. 1, in some implementations, the user device 102 may determine performance data or other types of values or representations based on the acquired first test data 104(1).

At 210, the user device 102 may determine correspondence between the received data and the threshold data 108. For example, the threshold data 108 may indicate particular content or one or more characteristics of a frame of video data that may indicate an issue associated with performance of the AUT 112. If the first test data 104(1) includes data indicative of a frame that corresponds to the content or characteristic(s) within a threshold similarity, the user device 102 may determine additional test data 104(2), which may include different types of data, data acquired at different rates or based on other parameters, and so forth. As another example, the threshold data 108 may indicate a threshold minimum quantity of power associated with a power source of the user device 102, and the first test data 104(1) may indicate a quantity of power greater than the threshold minimum quantity. As yet another example, the threshold data 108 may indicate a threshold maximum amount of processor or memory utilization associated with the user device 102, and the first test data 104(1) may indicate quantities of processor or memory utilization less than the threshold maximum. Use of the first test data 104(1) to determine possible issues associated with performance of the user device 102 or AUT 112 and to determine that the user device 102 is associated with sufficient power and computational resources, prior to causing the user device 102 to determine, process, or transmit additional test data 104(2), may reduce the impact of the determination, processing, and transmission of the additional test data 104(2) on performance of the user device 102 and may reduce the acquisition of non-useful data.

At 212, the user device 102 may determine second parameters for determining second test data 104(2). For example, the threshold data 108 or other data received from the host device 106 may indicate the second parameters for use acquiring second test data 104(2) when at least a portion of the first test data 104(1) corresponds to the threshold data 108. In other implementations, the user device 102 may determine a default or existing set of second parameters. In other implementations, the host device 106 may receive at least a portion of the first test data 104(1), or other data determined based on the first test data 104(1), and may provide data indicative of the second parameters, or additional threshold data 108, to the user device 102. For example, based on the correspondence between the first test data 104(1), or other data received by the host device 106, and the threshold data 108, the user device 102 may be caused to acquire one or more different types of data, to increase a rate or other parameter associated with determination or transmission of data, and so forth. Continuing the example, in response to a determination that the first test data 104(1) indicates a possible issue and that the user device 102 is associated with a quantity of power greater than a threshold and is utilizing computational resources less than a threshold, the user device 102 may be caused to determine, process, or transmit frames of video data at an increased rate, an increased resolution, and so forth.

At 214, the user device 102 may determine second test data 104(2) based on the second parameters during use of the AUT 112. For example, in response to a possible issue associated with performance of the user device 102 or AUT 112 indicated in the first test data 104(1), the user device 102 may be caused to acquire second test data 104(2) that includes frames of video data or other types of output data 114(2), which may consume a greater quantity of computational resources to determine, process, or transmit than the first test data 104(1).

At 216, the user device 102 may send at least a portion of the second test data 104(2), or other data determined based on the second test data 104(2), to the host device 106. The times, rates, and other characteristics of the transmission of data to the host device 106 may be determined at least in part using the second parameters.

At 218, the host device 106 may determine interface data 126 based on at least a portion of the received data. In some implementations, the interface data 126 may also be determined based on at least a portion of the first test data 104(1) or other received data that is based on the first test data 104(1). Determination of the interface data 126 may include determining values, graphical representations, or other characteristics that may represent the second test data 104(2). For example, a value representing the quality of a frame of video data received from the user device 102 may be determined based on characteristics of the frame of video data, such as blurriness, color saturation, and so forth. Example systems and methods for determining values representing the quality of video data are described with regard to U.S. patent application Ser. No. 17/006,596, incorporated by reference previously. In other implementations, the user device 102 may determine one or more values, graphical representations, or other data that may represent at least a portion of the second test data 104(2). For example, the user device 102 may transmit to the host device 106 values determined based on one or more frames of video data in place of or in addition to the frames of video data. Continuing the example, transmission of values determined by the user device 102 in place of the transmission of video data may conserve computational resources, prevent the transmission of potentially private information such as data presented to a user of the user device 102, and so forth.

At 220, the host device 106 may send at least a portion of the interface data 126 to the developer device 110, or in some implementations, to one or more other computing devices. At 222, the developer device 110 or other computing device(s) that receive the interface data 126 may present a user interface 128 based on the interface data 126. In other implementations, the host device 106 may determine the user interface 128 based on the interface data 126 and may send data indicative of the user interface 128 to one or more other computing devices to cause presentation of the user interface 128.

Figure 3:
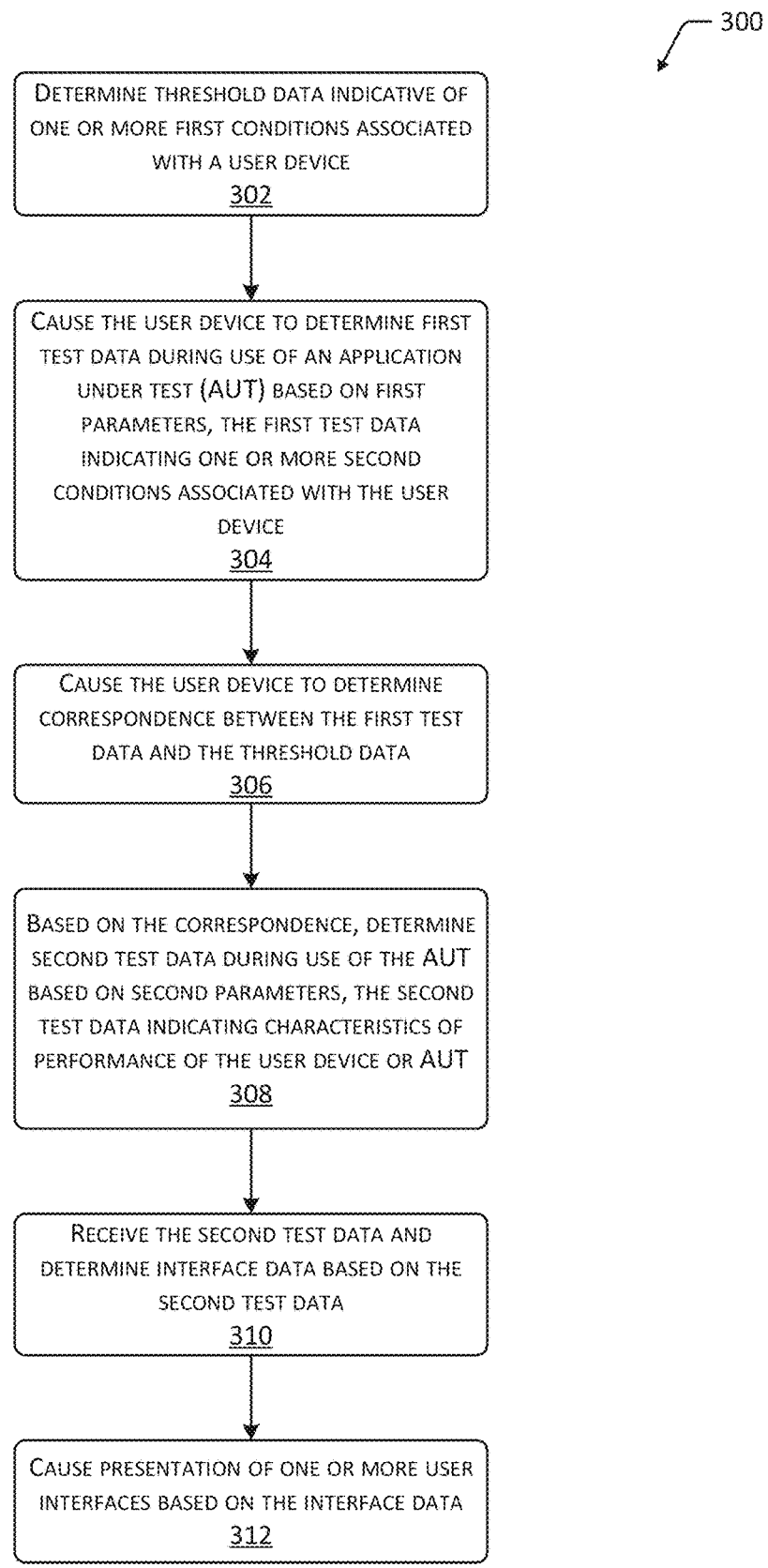
FIG. 3 is a flow diagram illustrating an implementation of a method for use of a host device to cause a user device to determine test data and transmit the test data, or other data determined based on the test data.

FIG. 3 is a flow diagram 300 illustrating an implementation of a method for use of a host device 106 to cause a user device 102 to determine test data 104 and transmit the test data 104, or other data determined based on the test data 104. At 302, a host device 106 may determine threshold data 108 indicative of one or more first conditions associated with a user device 102. In some implementations, threshold data 108 may be received from another computing device, such as a developer device 110, received via user input to the host device 106, or determined based on user input or data received from another computing device. For example, a user may input conditions under which a user device 102 is to be used to determine and transmit test data 104. As described with regard to FIG. 1, example conditions may include presentation of particular output or output having certain characteristics, receipt of particular input or input having certain characteristics, the status of a power source or computational resources associated with the user device 102, or characteristics of the user device 102 itself, such as location, device type, and so forth. In other implementations, threshold data 108 may include preexisting data or default data associated with the host device 106 that may not necessarily be received from another computing device or by user input. In still other implementations, threshold data 108 may be determined using one or more machine learning algorithms. For example, a machine learning algorithm may determine threshold data 108 based on previous conditions received from computing devices, the quality of data acquired from user devices 102 under various conditions, the impact on the performance of user devices 102 or AUTs 112 caused by the acquisition or transmission of test data 104, and so forth.

At 304, the user device 102 may be caused to determine first test data 104(1) during use of an application under test (AUT) 112 based on first parameters. In some implementations, the host device 106 may provide the threshold data 108, or other data determined based on the threshold data 108, to the user device 102. The data provided to the user device 102 may indicate types of data to be acquired, or other parameters associated with the first test data 104(1). The first test data 104(1) may indicate one or more conditions associated with the user device 102, such as a current status of a power source or computational resources, current inputs received or outputs presented, and so forth. The first parameters may control the types of data that are determined by the user device 102 and the manner in which the data is determined. For example, the first parameters may specify that the user device 102 is to store and process frames of video data at a certain rate having a certain resolution, and transmit data determined based on the frames of video data at a certain rate. As another example, the first parameters may specify that the user device 102 is to refrain from storing, processing, or transmitting video data but is to transmit information regarding a status of a power source of the user device 102 at a specified rate.

At 306, the user device 102 may determine correspondence between the first test data 104(1) and the threshold data 108. For example, the first test data 104(1) may indicate current conditions associated with the user device 102, such as a status of a power source, use of computational resources, received inputs, presented outputs, and so forth. The threshold data 108 may indicate one or more conditions that may correspond to an issue associated with performance of the user device 102 or AUT 112, such as characteristics of an output that may indicate an issue. The threshold data 108 may also indicate one or more conditions under which it may be suitable or unsuitable to cause a user device 102 to determine additional test data 104(2) or transmit the additional test data 104(2), such as a threshold quantity of power associated with a power source or a threshold amount of utilized computational resources. Based on the correspondence between the threshold data 108 and the first test data 104(1), the user device 102 may determine second parameters for the determination, processing, and transmission of the additional test data 104(2). In other implementations, the host device 106 may determine at least a portion of the first test data 104(1), or other data based on the first test data 104(1), from the user device 102, and the host device 106 may cause the user device 102 to acquire the second test data 104(2). For example, the host device 106 may provide a command or instruction, data indicative of second parameters for acquiring the second test data 104(2), or additional threshold data 108.

At 308, based on the correspondence, the user device 102 may determine second test data 104(2) during use of the AUT 112 based on second parameters. The second test data 104(2) may indicate characteristics of performance of the user device 102 or the AUT 112. The second parameters may control the types of data that are determined by the user device 102 and the manner in which the data is determined. For example, the host device 106 may send the threshold data 108, parameters determined based on the threshold data 18, a command, instruction, or other type of data to the user device 102. The data from the host device 106 may indicate types of data to be determined, rates at which the data is to be determined or transmitted, characteristics of the data to be determined, and so forth. For example, in response to first test data 104(1) indicating a possible issue associated with performance of the user device 102 or AUT 112, the user device 102 may acquire second test data 104(2) that includes additional types of data, that is acquired at a greater rate, or that has one or more characteristics associated with greater use of computational resources. Use of computational resources and impact to the performance of the user device 102 may be reduced by refraining from causing the second test data 104(2) to be acquired until the first test data 104(1) is determined to indicate a possible issue associated with the user device 102 or AUT 112.

At 310, the host device 106 may receive at least a portion of the second test data 104(2) from the user device 102. The host device 106 may determine interface data 126 based on at least a portion of the second test data 104(2). The interface data 126 may be indicative of values or other qualitative or quantitative characteristics associated with the inputs, outputs, or other conditions or actions of the user device 102 represented in the second test data 104(2). In other implementations, the user device 102 may determine at least a portion of the interface data 126 and may provide the interface data 126 to the host device 106 in addition to or in place of the second test data 104(2).

At 312, the host device 106 may cause presentation of one or more user interfaces 128 based on the interface data 126. For example, the host device 106 may be associated with one or more displays or other output devices, or the host device 106 may transmit at least a portion of the interface data 126 to one or more other computing devices, such as a developer device 110 associated with the AUT 112.

Figure 4:
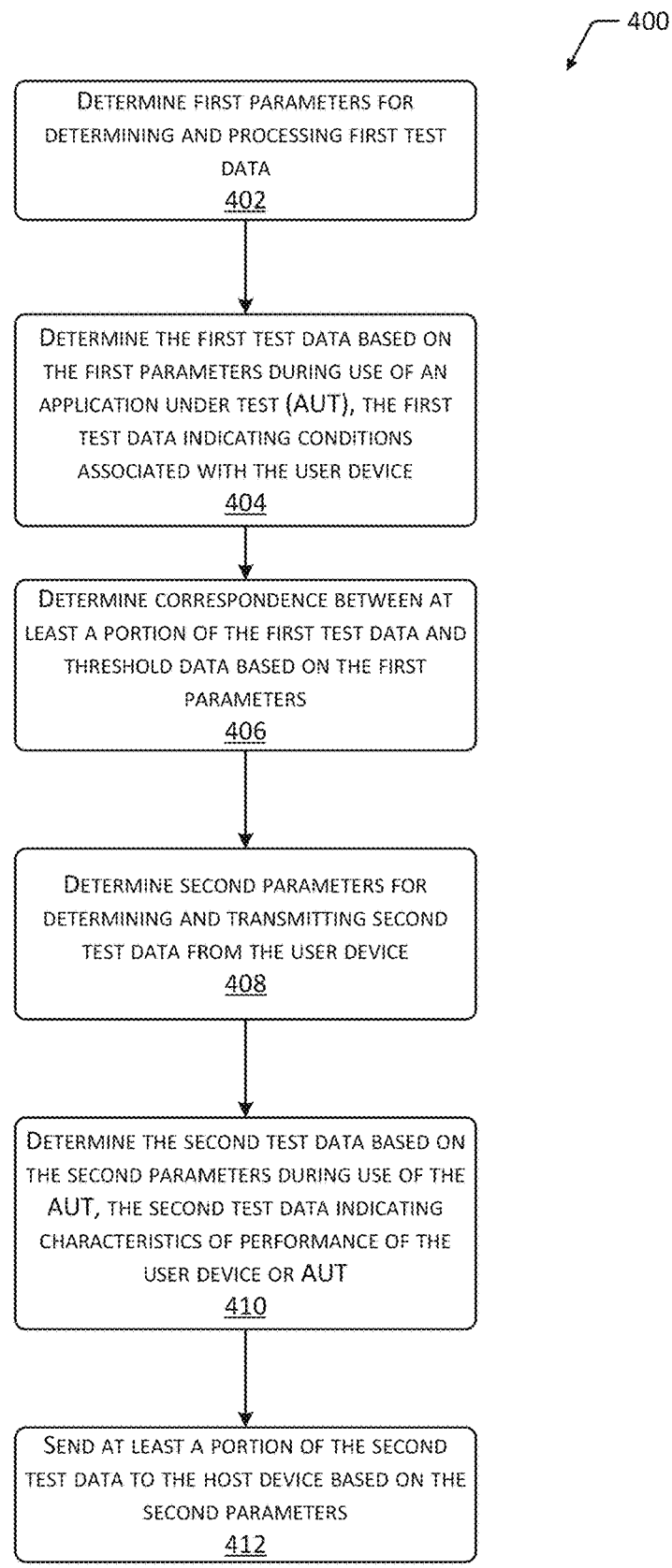
FIG. 4 is a flow diagram illustrating an implementation of a method for use of a user device to determine, process, and transmit test data, or other data determined based on test data.

FIG. 4 is a flow diagram 400 illustrating an implementation of a method for use of a user device 102 to determine, process, and transmit test data 104 or other data determined based on test data 104. At 402, the user device 102 may determine first parameters for determining and processing first test data 104(1). For example, a command, instruction, threshold data 108, or other type of data may be received from the host device 106. The command may specify one or more of the first parameters, such as types of data to be determined, types of data to be transmitted, rates at which various types of data are to be determined and transmitted, other characteristics of the data to be determined such as resolution of image data or video data, bitrate of audio data, and so forth. In some implementations, one or more of the first parameters may include preexisting or default parameters associated with the user device 102 or included in an SDK or other type of instructions for determining test data 104 that are stored on the user device 102.

At 404, the user device 102 may determine the first test data 104(1) based on the first parameters during use of an application under test (AUT) 112. The first test data 104(1) may be indicative of conditions associated with the user device 102. For example, as described with regard to FIG. 1, the first test data 104(1) may include one or more of output data 114(1) indicative of outputs presented by the user device 102, input data 116(1) indicative of inputs received by the user device 102, power data 118(1) indicative of a status associated with a power source of the user device 102, resource data 120(1) indicative of computational resources used by the user device 102, device data 122(1) indicative of characteristics, properties, or components of the user device 102, and so forth. The specific types of data that are included in the first test data 104(1), the rate at which the data is determined and stored, and the characteristics of the determined data may be determined based on the first parameters.

At 406, the user device 102 may determine correspondence between at least a portion of the first test data 104(1) and threshold data 108 based on the first parameters. For example, the first parameters may control the types of data that are processed by the user device 102, a rate or frequency at which the data is processed, characteristics of the processed data or of the manner in which the data is processed, and so forth. In other implementations, the host device 106 may determine correspondence between at least a portion of the first test data 104(1) and threshold data 108 and may provide additional threshold data 108, additional parameters, or other data to the user device 102 to cause the user device 102 to acquire additional test data 104(2).

In some implementations, the first test data 104(1) may include one or more frames of video data that represent an output presented using the user device 102. However, continuous transmission of video data, or periodic transmission of video data based on a selected frame rate or other measure of frequency, may consume a large quantity of computational resources. Additionally, in cases where a display output does not change for a period of time, transmission of frames of video data may include redundant or non-useful data. In some implementations, the user device 102 may be configured to determine when a change in a display output associated with the AUT 112 is determined. For example, an SDK or other type of instructions associated with the user device 102 or AUT 112 may determine when a portion of a display associated with the AUT 112, such as a window within a foreground of the display of the user device 102, is refreshed. As another example, the SDK or other instructions may determine when the AUT 112 performs a function associated with a change in a display output. In other cases, the SDK or other type of instructions may function as a system application or within the operating system of the user device 102. In such a case, the SDK or other instructions may determine changes in the display output based on access to one or more system files associated with the user device 102. In some implementations, the user device 102 may be configured to determine when a change in a display output occurs and store and process frames in response to the change in the display output to reduce the transmission of redundant or non-useful data in cases where a display output does not change for a period of time.

At 408, the user device 102 may determine second parameters for determining and transmitting second test data 104(2) from the user device 102 to the host device 106. For example, the user device 102 may determine one or more potential issues associated with performance of the user device 102 or AUT 112 based on the first test data 104(1). The second parameters may cause the user device 102 to determine one or more different types of data, to determine and transmit data at a different rate or having other characteristics, and so forth. For example, if the first test data 104(1) indicates a possible issue associated with a frame of video data or use of computational resources by the user device 102, and also indicates that a quantity of power associated with a power source of the user device 102 is greater than a threshold value, the second parameters may cause the user device 102 to acquire and transmit second test data 104(2), or other data determined based on the second test data 104(2), to the host device 106 at a greater rate than the rate associated with the first parameters.

At 410, the user device 102 may determine the second test data 104(2) based on the second parameters during use of the AUT 112. The second test data 104(2) may indicate characteristics of performance of the user device 102 or AUT 112. The second test data 104(2) may include the same types of data described with regard to the first test data 104(1). In other cases, the second test data 104(2) may include one or more types of data not included in the first test data 104(1), or the first test data 104(1) may include one or more types of data not included in the second test data 104(2). The second parameters may control the types of data that are determined, a rate or frequency at which the data is determined, characteristics of the determined data, and so forth.

At 412, the user device 102 may send at least a portion of the second test data 104(2) to the host device 106 based on the second parameters. For example, the second parameters may control the types of data that are transmitted, a rate or frequency at which the data is transmitted, characteristics of the transmitted data or of the transmission itself, and so forth. In some implementations, as described with regard to block 406, the user device 102 may be configured to determine a change in a display output before storing or transmitting a frame of video data.

In some implementations, the user device 102 may be configured to transmit the second test data 104(2) to the host device 106 based on a status of a wireless communication interface of the user device 102. For example, the user device 102 may be configured to determine that the wireless communication interface is active, such as for use transmitting or receiving data unrelated to the SDK, prior to sending the second test data 104(2). In some implementations, the active status of the wireless communication interface may be determined by determining a first amount of data transmitted or received at a previous time, and a second amount at a current time, and determining that the second amount is greater than the first amount. In some implementations, the user device 102 may be configured to determine that the wireless communication interface is active, and that the wireless communication interface has not transmitted or received data for at least a threshold period of time. For example, the user device 102 may withhold transmission of the second test data 104(2) until after the user device 102 has completed a transmission or receipt of other data, then transmit the second test data 104(2) while the wireless communication interface remains active. Withholding transmission of data until times when an active status of a wireless communication interface is determined may reduce the use of computational resources, such as by reducing the power and other resources that would be used to activate the wireless communication interface. Withholding transmission of second test data 104(2) until transmission or receipt of data by the user device 102 for other purposes has ceased for at least a threshold period of time may reduce the impact of the transmission of the second test data 104(2) on the performance of the user device 102 or AUT 112.

In some implementations, the user device 102 may determine test data 104 and transmit test data 104 based on or more conditions associated with the user device 102, inputs received by the user device 102, and so forth. For example, the user device 102 may be configured to determine frames of video data associated with an AUT 112 only at times when a window associated with the AUT 112 is within a foreground of a display area of the user device 102. As another example, the user device 102 may be configured to determine frames of video data associated with an AUT 112 in response to input that indicates user engagement, such as receipt of a touch input or voice input within a threshold period of time, determination of the presence or gaze of a user using a camera, and so forth. As yet another example, the user device 102 may be configured to determine or transmit test data 104 based on receipt of particular types of user input, such as a series of rapid taps to a touch sensor.

Figure 5:
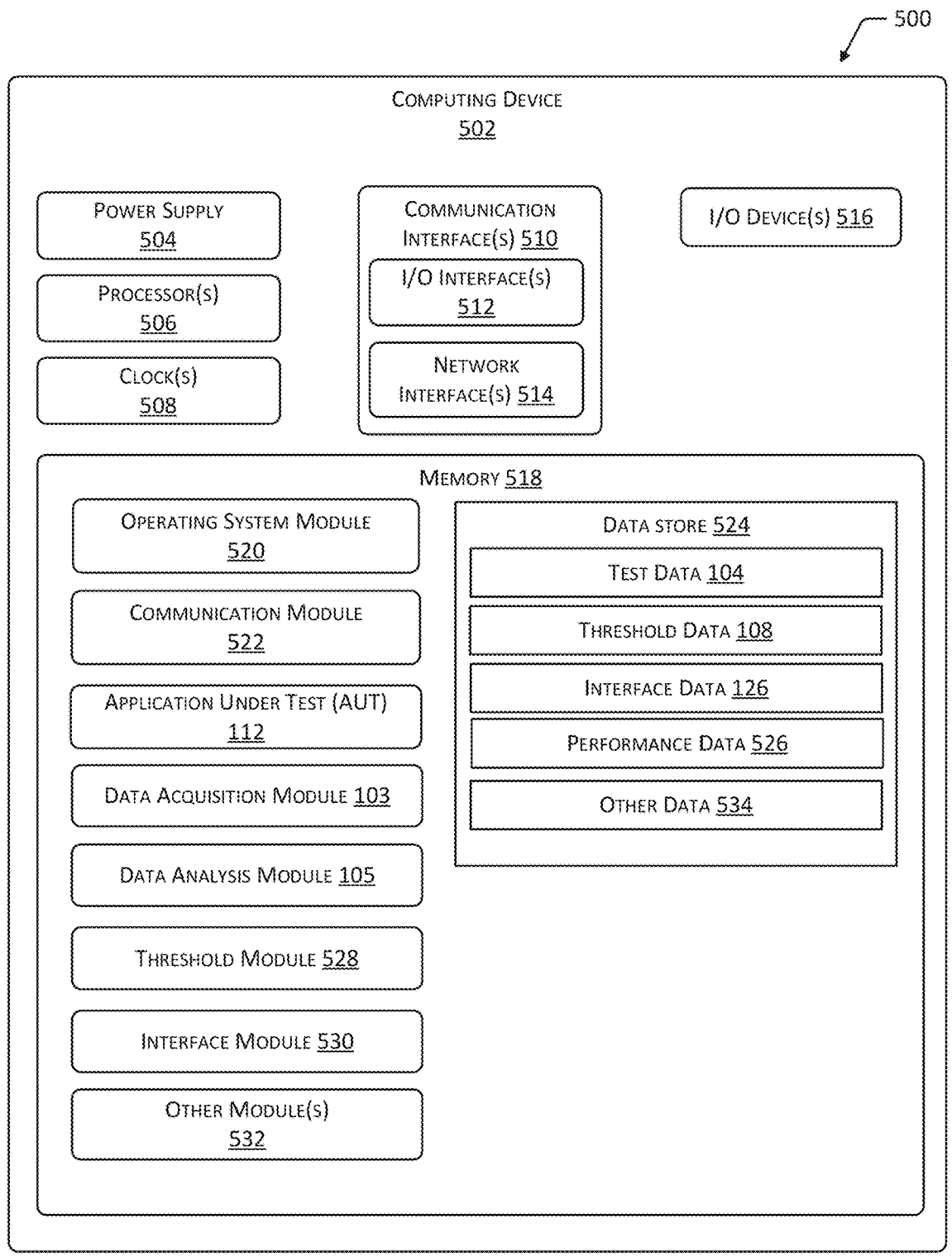
FIG. 5 is a block diagram depicting an implementation of a computing device within the present disclosure.

FIG. 5 is a block diagram 500 depicting an implementation of a computing device 502 within the present disclosure. The computing device 502 may include one or more host devices 106, as shown in FIGS. 1 and 2. However, in other implementations, one or more user devices 102, developer devices 110, or other computing devices 502 in communication with a host device 106 may perform one or more of the functions described with regard to the computing device 502. As such, while FIG. 5 depicts a single block diagram 500 of an example computing device 502, any number and any type of computing devices 502 may be used to perform the functions described herein.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC). In some implementations, the functionality described with regard to one or more of the modules may be incorporated within a software development kit (SDK), may be performed using one or more Application Programming Interfaces (APIs), and so forth.

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

The memory 518 may also include a communication module 522, which may be configured to establish communications with one or more other computing devices 502. Communications may be authenticated, encrypted, and so forth. In some implementations, communication may be established between computing devices 502 by determining sets of communication parameters, such as protocols, types or formats of data, networks, and routes for transmission of data that may be used by two computing devices 502 when sending or receiving data. For example, implementations by which computing devices 502 may establish communication are described in U.S. patent application Ser. No. 17/179,136, incorporated by reference previously.

One or more data stores 524 and one or more of the following modules may also be associated with the memory 518. The modules may be executed as foreground applications, background tasks, daemons, and so forth. The data store(s) 524 may use a flat file, database, linked list, tree, executable code, script, or other data structure to store information. In some implementations, the data store(s) 524 or a portion of the data store(s) 524 may be distributed across one or more other devices including other computing devices 502, network attached storage devices, and so forth.

The memory 518 may also store one or more applications under test 112 (AUT). An AUT 112 may include code or other types of computer-executable instructions that may cause a computing device 502 to perform one or more functions. In some implementations, the functions may be associated with one or more I/O devices 516, such as acquiring data using a camera or microphone, or presenting output using a display or speaker. Functions may also include generation, processing, or presentation of data. Characteristics of the data associated with a computing device 502 executing the AUT 112 may be used to determine performance of the AUT 112 or of the computing device 502 under various conditions. For example, a particular function of the AUT 112 may be recorded over time, and the network conditions, device conditions, and other factors that may affect performance of the AUT 112 at particular times may also be determined. A user interface 128 or another type of output may be presented that associates characteristics of performance of the AUT 112 with times at which the characteristics of performance occurred, and with other characteristics of the AUT 112, computing device 502 that executes the AUT 112, networks accessed by the computing device 502, other computing devices 502 accessed by the computing device 502, and so forth.

The memory 518 may store the data acquisition module 103. The data acquisition module 103 may determine test data 104 based on data associated with the AUT 112, data associated with the status or operation of the computing device 502 or components of the computing device 502, use of computational resources by the computing device 502, and so forth. The data acquisition module 103 may access data associated with functions performed by the AUT 112, inputs received and outputs presented by the I/O devices 516, use of the power supply 504, processor(s) 506, or communication interface(s) 510, and so forth.

The memory 518 may also store the data analysis module 105. The data analysis module 105 may determine performance data 526 based at least in part on test data 104 acquired during use of an AUT 112 by one or more user devices 102. The performance data 526 may include data indicative of performance of the AUT 112 or a computing device 502 executing the AUT 112. For example, performance data 526 may be determined by determining values indicative of characteristics of a presented output, received input, status of a power source, use of computational resources, and so forth. The data analysis module 105 may also determine correspondence between test data 104 and threshold data 108, which may be used to control the acquisition of additional test data 104, determine parameters for acquiring, processing, and transmitting additional test data 104, and so forth.

The memory 518 may store a threshold module 528. The threshold module 528 may determine threshold data 108 based on data indicative of one or more conditions that is stored in association with the computing device 502 or received from another computing device 502. For example, as described with regard to FIG. 1, a developer device 110 may send threshold data 108 or other data indicative of one or more conditions associated with a user device 102 to the computing device 502. In some implementations, the threshold module 528 may store the data received from the developer device 110, or may process the received data to determine the threshold data 108. In other implementations, the threshold module 528 may determine existing threshold data 108 stored in association with the computing device 502 that may be used to control the functions associated with a user device 102. For example, threshold data 108 may be stored in association with data indicative of a particular user device 102, type of user device 102, characteristic(s) of a user device 102, and so forth, and the threshold module 528 may determine the user device 102, type, or characteristics of the user device 102 and corresponding threshold data 108 to be used to control the determination and transmission of test data 104 by the user device 102. In some implementations, the threshold module 528 may include one or more machine learning algorithms. For example, a machine learning algorithm may determine threshold data 108 based on previous conditions received from computing devices, the quality of data acquired from user devices 102 under various conditions, the impact on the performance of user devices 102 or AUTs 112 caused by the acquisition or transmission of test data 104, and so forth.

The memory 518 may additionally store an interface module 530. The interface module 530 may determine interface data 126 based on test data 104 and performance data 526. Interface data 126 may be used to generate one or more user interfaces 128 indicative of performance characteristics of an AUT 112 or of a computing device 502 during use of the AUT 112. In some implementations, the interface module 530 may determine one or more user interfaces 128 based on the interface data 126 and may send the user interfaces 128 to other computing devices 502. In other implementations, the interface data 126 may be sent to other computing devices 502 to cause generation of the user interface(s) 128.

Other modules 532 may also be present in the memory 518. For example, other modules 532 may include user interface modules for receiving user input for processing interactions with user interfaces 128. Other modules 532 may include modules for modifying portions of the AUT 112 based on determined issues. Other modules 532 may include authorization modules for receiving authorization from users regarding collection, storage, or transmission of data. Other modules 532 may include modules for modifying threshold data 108 based on user input, received data, machine learned values, and so forth. Other modules 532 may further include encryption modules to encrypt and decrypt communications between computing devices 502, authentication modules to authenticate communications sent or received by computing devices 502, a permission module to assign, determine, and manage user permissions to access or modify data associated with computing devices 502, and so forth.

Other data 534 within the data store(s) 524 may include configurations, settings, preferences, and default values associated with computing devices 502. Other data 534 may also include encryption keys and schema, access credentials, and so forth. Other data 534 may additionally include rules or criteria for determining when to cause devices to perform functions, such as execution of an AUT 112 or performance of other functions associated with the AUT 112, determination and storage of data, transmission of data, and so forth.

In different implementations, different computing devices 502 may have different capabilities or capacities. For example, host devices 106, such as servers, may have greater processing capabilities or data storage capacity than user devices 102, such as smartphones.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
a first computing device comprising:
one or more first memories storing first computer-executable instructions; and
one or more first hardware processors to execute the first computer-executable instructions to:
receive, from a second computing device:
threshold data indicative of one or more first conditions associated with acquisition of first data by the first computing device during use of an application, and
one or more first parameters for the acquisition of the first data;
determine the first data based on the one or more first parameters, wherein the first data is indicative of one or more first outputs presented by the first computing device during use of the application;
determine that at least a portion of the first data corresponds to the one or more first conditions indicated by the threshold data;
in response to correspondence between the first data and the threshold data, determine second data based on one or more second parameters that differ from the one or more first parameters, wherein the second data is indicative of one or more second outputs presented by the first computing device during use of the application;
transmit at least a portion of the second data to the second computing device;
determine that one or more of a quantity of the second data or a rate at which the second data is determined exceeds a threshold value associated with a rate of processing the second data; and
in response to the one or more of the quantity or the rate exceeding the threshold value, one or more of: cease determining the second data or decrease a rate associated with determining the second data;
wherein the second computing device comprises:
one or more second memories storing second computer-executable instructions; and
one or more second hardware processors to execute the second computer-executable instructions to:

provide the threshold data to the first computing device;

receive the at least a portion of second data from the first computing device;

generate user interface data that is indicative of the at least a portion of the second data; and send the user interface data to one or more of the first computing device, the second computing device, or a third computing device to cause presentation of a user interface based on the user interface data.

2. The system of claim 1, further comprising second computer-executable instructions to:

receive the at least a portion of the first data from the first computing device; and send data indicative of the one or more second parameters to the first computing device in response to the at least a portion of the first data.

3. The system of claim 1, wherein the first computing device further comprises first computer-executable instructions to:

determine a first display output associated with the application at a first time;

determine a second display output associated with the application at a second time; and determine that the first display output differs from the second display output, wherein one or more of the first data or the second data is determined based on the second display output.

4. The system of claim 1, wherein the first computing device further comprises first computer-executable instructions to:

determine third data indicative of a change in a display output of a display device associated with the first computing device, wherein one or more of the first data or the second data is determined based on the third data.

5. The system of claim 1, wherein the first computing device further comprises first computer-executable instructions to:

determine an active status of a wireless communication interface associated with the first computing device, wherein the at least a portion of the second data is sent to the second computing device based on determining the active status of the wireless communication interface.

6. The system of claim 5, wherein the first computing device further comprises first computer-executable instructions to:

determine a first amount of data that is one or more of transmitted or received using the wireless communication interface at a first time;

determine a second amount of data that is one or more of transmitted or received using the wireless communication interface at a second time after the first time; and determine that the second amount of data is greater than the first amount of data, wherein the active status of the wireless communication interface is determined based on the second amount of data being greater than the first amount of data.

7. The system of claim 5, wherein the first computing device further comprises first computer-executable instructions to:

determine that at least a threshold period of time has elapsed after a cessation of one or more of transmission of data or receipt of data using the wireless communication interface; and determine the active status of the wireless communication interface after the at least the threshold period of time has elapsed, wherein the second data is sent to the second computing device further based on determining that the at least the threshold period of time has elapsed after the cessation.

8. The system of claim 1, wherein the one or more first conditions include one or more of:

a quantity of remaining charge associated with a power source of the first computing device; or a charging status of the power source of the first computing device.

9. The system of claim 1, wherein the one or more first conditions include one or more of:

a type of user input received by an input device of the first computing device; or a time associated with the user input received by the input device of the first computing device.

10. The system of claim 1, further comprising first computer-executable instructions to:

determine, based on the one or more first outputs, one or more first characteristics of a frame associated with a display output of the first computing device; and wherein the one or more first conditions indicated by the threshold data correspond to one or more second characteristics indicative of an error associated with the frame.

11. A system comprising:

a first computing device comprising:

one or more first memories storing first computer-executable instructions; and one or more first hardware processors to execute the first computer-executable instructions to:

determine one or more first parameters associated with acquisition of first data;

determine the first data based on the one or more first parameters, wherein the first data is indicative of one or more first outputs associated with an application executed by the first computing device;

based on correspondence between the one or more first outputs and threshold data indicative of one or more conditions for acquisition of second data, determine one or more second parameters associated with the acquisition of the second data;

determine the second data based on the one or more second parameters, wherein the second data is indicative of one or more second outputs associated with the application;

determine that at least a threshold period of time has elapsed after a cessation of use of a wireless communication interface;

determine an active status of the wireless communication interface after the at least a threshold period of time has elapsed; and in response to the active status and determining that the at least the threshold period of time has elapsed, send at least a portion of the second data to a second computing device.

12. The system of claim 11, further comprising the second computing device, wherein the second computing device comprises:

one or more second memories storing second computer-executable instructions; and one or more second hardware processors to execute the second computer-executable instructions to:

receive at least a portion of the first data from the first computing device;

determine the correspondence between the one or more first outputs and the threshold data;

send third data indicative of the one or more second parameters to the first computing device in response to the correspondence;

receive the at least a portion of the second data from the first computing device;

generate user interface data that is indicative of the at least a portion of the second data; and send the user interface data to one or more of the first computing device, the second computing device, or a third computing device to cause presentation of a user interface based on the user interface data.

13. The system of claim 11, further comprising first computer-executable instructions to:

determine a change in a display output associated with an output device of the first computing device;

wherein one or more of the first data or the second data is determined in response to the change in the display output.

14. The system of claim 11, further comprising first computer-executable instructions to:

determine an audio output associated with the application;

wherein the second data is determined based at least in part on the audio output and is indicative of one or more characteristics of the audio output.

15. The system of claim 11, further comprising computer-executable instructions to:

determine a first amount of data that is one or more of transmitted or received using the wireless communication interface at a first time;

determine a second amount of data that is one or more of transmitted or received using the wireless communication interface at a second time after the first time; and determine that the second amount of data is greater than the first amount of data, wherein the active status of the wireless communication interface is further determined based on the second amount of data being greater than the first amount of data.

16. The system of claim 11, further comprising computer-executable instructions to:

determine that one or more of a quantity of the second data determined by the first computing device or a rate at which the first data is determined by the first computing device exceeds a threshold value associated with a rate of processing of the second data; and cause the first computing device to one or more of: cease determining the second data or decrease a rate associated with determining the second data.

17. A method comprising:

determining, using a first computing device, first data indicative of one or more first conditions associated with the first computing device during use of an application;

determining, using the first computing device, correspondence between the first data and threshold data indicative of one or more second conditions, wherein the one or more second conditions are indicative of an error associated with a frame of a first display output associated with the application and presented using a display device of the first computing device, and wherein the one or more second conditions are associated with causing the first computing device to determine second data indicative of the first display output;

determining, using the first computing device, a change from a second display output associated with the display device to the first display output;

in response to the change, and based on the correspondence between the first data and the threshold data, determining the second data using the first computing device, wherein the second data is indicative of the first display output;

sending at least a portion of the second data from the first computing device to a second computing device;

determining, using the second computing device, user interface data that is indicative of at least a portion of the second data; and sending, using the second computing device, the user interface data to one or more of the first computing device, the second computing device, or a third computing device to cause presentation of a user interface based on the user interface data.

18. The method of claim 17, further comprising:

determining, using the first computing device, an active status of a wireless communication interface associated with the first computing device; and determining, using the first computing device, that at least a threshold period of time has elapsed after a cessation of use of the wireless communication interface;

wherein the at least a portion of the second data is sent from the first computing device to the second computing device in response to the active status and the elapsing of the at least the threshold period of time after the cessation.

19. The method of claim 17, further comprising:

determining, using the first computing device, that one or more of a quantity or a rate associated with processing of the second data determined by the first computing device exceeds a threshold value associated with a rate of processing of the second data; and causing the first computing device to one or more of: cease determining the second data or decrease the rate associated with determining of the second data.

20. The method of claim 17, further comprising:

determining a first amount of data that is one or more of transmitted or received using a wireless communication interface at a first time;

determining a second amount of data that is one or more of transmitted or received using the wireless communication interface at a second time after the first time; and determining an active status of the wireless communication interface based on the second amount of data being greater than the first amount of data;

wherein the at least a portion of the second data is sent from the first computing device to the second computing device in response to the active status.

* * * * *